No. 856,051.
PATENTED JUNE 4, 1907.
J. GRAHAM.
SHEAF LOADING MACHINE.
APPLICATION FILED JUNE 8, 1905.
2 SHEETS—SHEET 2.
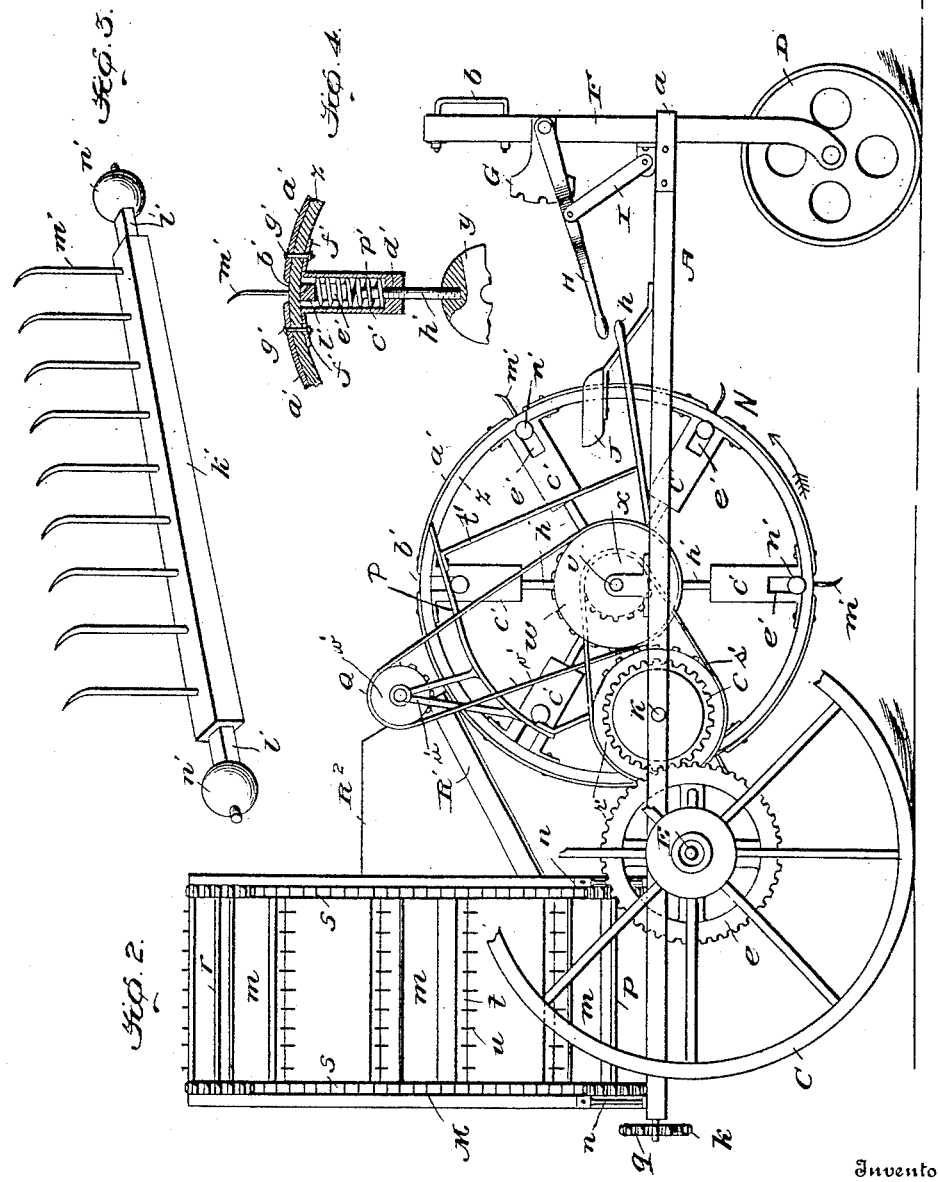

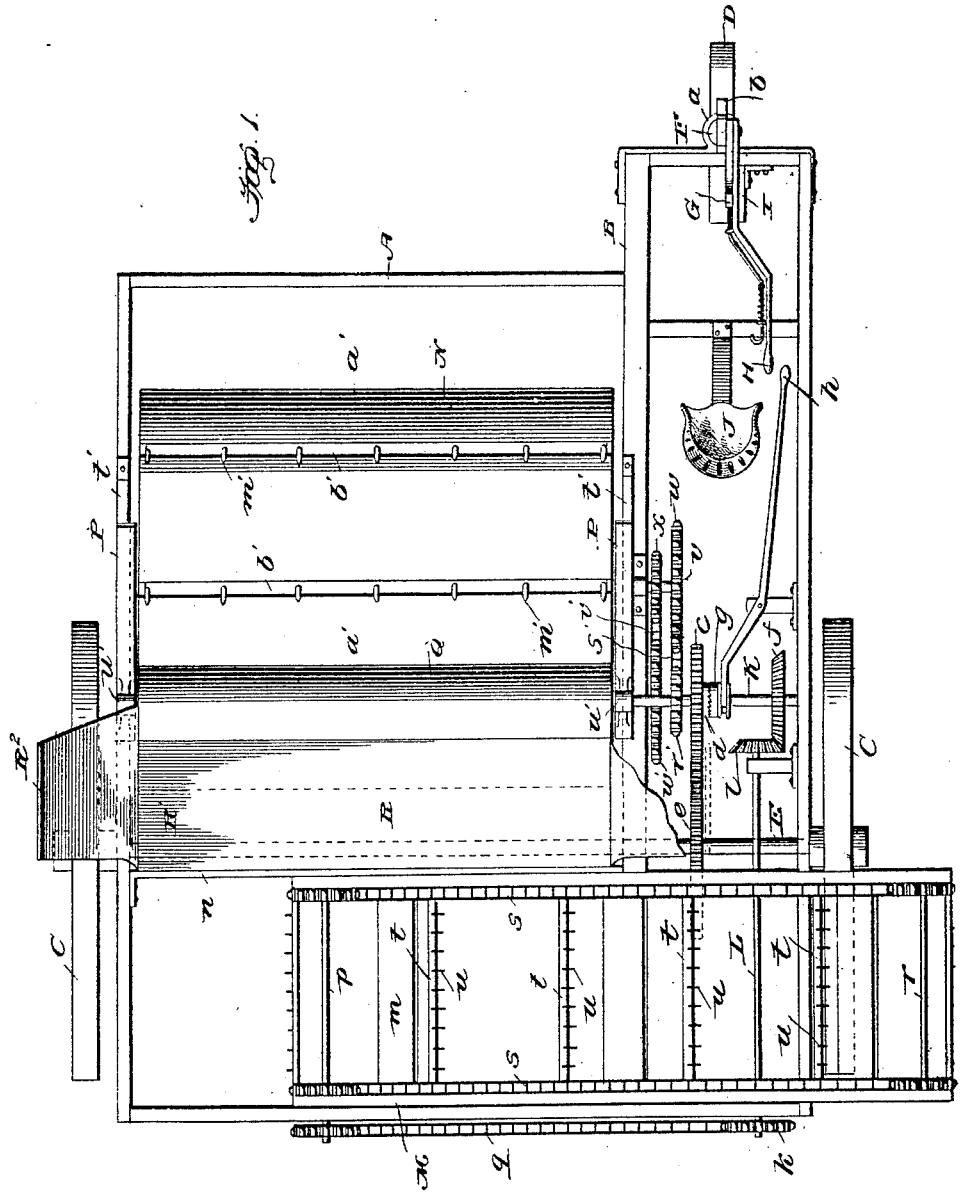

UNITED STATES PATENT OFFICE.

JAMES GRAHAM, OF ROSEBERRY, MANITOBA, CANADA.

SHEAF-LOADING MACHINE.

No. 856,051.  Specification of Letters Patent.  Patented June 4, 1907.

Application filed June 8, 1905. Serial No. 264,345.

*To all whom it may concern:*

Be it known that I, JAMES GRAHAM, a citizen of Canada, residing at Roseberry, in the Province of Manitoba and Dominion of Canada, have invented new and useful Improvements in Sheaf-Loading Machines, of which the following is a specification.

My invention pertains to sheaf loaders; and it contemplates the provision of a machine adapted when moved along at one side of a vehicle, to expeditiously take up and convey sheaves upward and laterally and deliver the same into the vehicle.

With the foregoing in mind, the invention will be fully understood from the following description and claims when the same are read in connection with the accompanying drawings, forming part of this specification, in which:

Figure 1 is a top plan view of the machine constituting the present and preferred embodiment of my invention. Fig. 2 is a broken elevation of the right hand side of the machine. Fig. 3 is an enlarged, detail perspective view of one of the toothed bars of the rotary cylinder. Fig. 4 is an enlarged detail section illustrating the arrangement of one of the spokes and one of the spring casings of the rotary cylinder, relative to a hub, a rim and the cover thereof.

Similar letters designate corresponding parts in all of the views of the drawings, referring to which:

A is the main frame of the machine, which is preferably rectangular in form, and B is a sub-frame disposed at the right-hand side of the main frame. The said main frame A and sub-frame B are supported by rear wheel C and a front wheel D; the rear wheels C being keyed on a transverse shaft E journaled in suitable bearings on the main and sub-frames, and the front wheels D being carried by an upright standard F which extends loosely through a sleeve $a$ on the sub-frame B and is provided adjacent to its upper end with a staple $b$ to receive a draw bar extending laterally from the before mentioned vehicle. On the standard F is carried a segmental rack G and a hand lever H; the latter being provided with a detent to engage the segmental rack, and being connected through a link I with the frame. The lever H rests within convenient reach of the machine attendant who sits on the seat J, and the said attendant is enabled by moving the said lever up, to raise the frame, and in that way adapt the rotary cylinder, presently described, to clear stones and other obstructions in its path.

K is a transverse shaft from which motion is taken to rotate the cylinder, presently described, and L is a longitudinal shaft from which motion is taken, as hereinafter described, to drive the endless apron of the elevator. The shaft K is equipped with a loose spur gear $c$ which is provided with a clutch member $d$ and is intermeshed with a spur gear $e$ fast on shaft E; and it is also equipped with a miter gear $f$ and a feathered clutch member $g$ which latter is movable through the medium of a hand lever $h$, whereby it will be apparent that the attendant is enabled to disconnect the shaft K from the spur gear $c$ whenever it is desired to stop the rotary cylinder and the endless apron of the elevator. The shaft L is provided as shown with a sprocket wheel $k$ and a miter gear $l$; the latter being intermeshed with the spur gear $f$.

M is the elevator of the machine which declines toward the left hand side of the main frame A. The said elevator comprises a frame $m$ fixedly connected at its lower end to the main frame A and also fixedly connected to brace rods $n$, a lower shaft $p$ bearing sprocket wheels one of which is connected through a belt $q$ with the sprocket wheel $k$ on shaft L, an upper shaft $r$ bearing sprockets, and an apron formed by sprocket belts $s$, cross slats $t$ connected to and carried by said slats, and teeth $u$ connected to the slots and arranged when moving upwardly to extend outwardly and upwardly from the slots. When the endless apron is driven in the proper direction, and sheaves are deposited on the face thereof it will obviously carry the sheaves up to the top of the elevator and there discharge the same laterally from the machine into the before mentioned vehicle moved at the side of the machine.

N is the cylinder which is rotated in the direction indicated by arrow, Fig. 2, and has for its function to take sheaves up into the machine. The said cylinder comprises a shaft $v$ journaled in suitable bearings on the main frame and bearing sprocket wheels $w$ and $x$, hubs $y$ fixed on the shaft $v$ adjacent to opposite ends thereof and having threaded sockets in their peripheries, rims $z$, cover sections $a'$ connected to the perimeters of the rims and having spaces $b'$ between their longitudinal edges, casings $c'$ having threaded apertures $d'$, Fig. 4, in their inner ends and slots $e'$ in their outer portions, and also having apertured lugs $f'$ on their outer ends detachably connected by bolts $g'$ to the rims $z$ and cover sections $a'$, spokes $h'$ having threaded portions arranged in and engaging the threaded sockets in the hubs $y$ and the threaded apertures $d'$ in the casings $c'$, bars $k'$ arranged longitudinally of the cylinder and having reduced end portions $l'$ disposed in the slots $e'$ of casings $c'$, whereby the bars are adapted to move bodily in and out, sheath-engaging teeth $m'$ fixedly connected to the bars $k'$ and extending outwardly through the spaces $b'$ between the cover sections $a'$, globular rollers $n'$ mounted on the reduced portions $l'$ at opposite ends of the bars $k'$, and coiled springs $p'$ contained in the casings $c'$ and interposed between the inner end walls thereof and the reduced portions $l'$ of the bars $k'$. The said springs $p'$ have for their purpose to yieldingly press the bars $k'$ outward so as to assure the teeth $m'$ extending beyond the perimeter of the cylinder body after the manner shown at the bottom and at the front of the cylinder in Fig. 2. In this connection it will be apparent when one of the springs $p'$ is broken or becomes impaired it may be removed and replaced with a new spring. To do this the spoke $h'$ connected to the casing $c'$ containing the spring is first turned out of its socket in the hub and then the casing is disconnected from the adjacent rim $z$ and cover sections $a'$. With this done the connected spoke and casing may be removed from the cylinder and the spring may be taken out and a new spring put in its place, after which the spoke and casing may be replaced and connected to the hub and the rim and cover sections, respectively, in the manner shown and before described. The cylinder N is rotated in the direction indicated by arrow, Fig. 2, from the shaft K through the medium of the sprocket wheel $r'$ fast on the shaft K and the chain $s'$ connecting the wheel $r'$ and the wheel $x$; the speed of the said cylinder N being about four times greater than that of the rear wheels C.

P P are fixed cam bars arranged at opposite ends of the cylinder N and mounted on supports $t'$ rising from the main frame A. These cam bars P are designed by engaging the rollers $n'$ of the toothed bars $k'$ after the manner shown in Fig. 2, to move the teeth $m'$ inwardly through the spaces $b'$ between the cover sections $a'$ of the cylinder N so as to assure the said teeth releasing a sheath after they carry it upwardly and rearwardly to a point beyond the vertical center of the cylinder. As will be seen by reference to Fig. 2, the cam bars P hold the toothed bars in until the latter pass below the deck, presently described, when the toothed bars pass out of engagement with the cam bars and the springs $p'$ operate to return the toothed bars to and yieldingly hold said toothed bars in their normal position.

Q is a roller which serves to expedite the delivery of the sheaves to the apron of the elevator M, and also to prevent straw from passing or lodging between the cylinder N and the deck, presently described. The said roller Q extends longitudinally of and corresponds in length to the cylinder N, is journaled in suitable supports $u'$ rising from the cam bars P, and is rapidly rotated from the cylinder shaft $v$ through the medium of the sprocket wheel $w$ a sprocket chain $v'$ and a sprocket wheel $w'$.

R is the deck of the machine, over which the sheaves pass *en route* between the roller Q and the apron of the elevator M. The said deck R is fixedly connected to the frame $m$ of elevator M and the supports $u'$ of roller Q so as to decline generally toward the face of the elevator, and its left hand portion R' declines inwardly toward the elevator as shown. The deck also has sloping sides $R^2$ which project beyond the ends of cylinder N sufficiently far to assure safe delivery of the sheaves to the elevator.

In the practical use of my novel loader, it will be apparent that when the loader is moved over a field by the means described or by any other means compatible with my invention, the cylinder N will take sheaves from the ground or out of stooks and carry the same upwardly and rearwardly to the roller Q. This latter will expedite the passage of the sheaves over the deck R to the apron of the elevator M, and the said apron will carry the sheaves upwardly and laterally and discharge the same into the vehicle moving at the side of the loader.

It will be gathered from the foregoing that my novel machine is expeditious in serving the purpose stated and requires but a minimum amount of attention while in operation; also that the machine is simple, light of draft, and well adapted to withstand the usage to which sheaf loaders are ordinarily subjected.

I have entered into a detailed description of the construction and relative arrangement of the parts embraced in the present and preferred embodiment of my invention in order to impart a full, clear and exact understanding of the said embodiment. I do not desire, however, to be understood as confining myself to the said specific construction and relative arrangement of parts as such changes or modifications may be made in practice as fairly fall within the scope of my invention as claimed.

Having described my invention, what I claim and desire to secure by Letters-Patent, is:

1. The combination in a sheaf loading machine, of a frame, a rotary cylinder, means for rotating the cylinder, spring-pressed toothed-bars carried by the cylinder and movable in and out, fixed cam bars for moving the toothed bars in, an elevator extending in the direction of the width of the machine, a deck which inclines from the upper rear portion of the cylinder to the elevator, a roller arranged to engage the sheaves when the latter are released from the toothed bars and assist the passage of the said sheaves to the deck, and means for rotating said roller.

2. In a sheaf loader, a rotary cylinder comprising hubs having threaded sockets in their peripheries, rims, cover sections arranged on the rims, casings having threaded apertures in their inner ends and slots in their outer portions and also having apertured lugs at their outer ends, bolts detachably connecting said lugs to the rims and cover sections, spokes having threaded portions arranged in and engaging the threaded sockets in the hubs and the threaded apertures in the inner ends of the casings, toothed bars having reduced portions movable in and out in the slots of the casings, and springs contained in the casings and pressing said toothed bars outward.

3. In a sheaf loader, a rotary cylinder comprising hubs having threaded sockets in their peripheries, rims, cover sections arranged on the rims, casings having threaded apertures in their inner ends and slots in their outer portions and also having apertured lugs at their outer ends, bolts detachably connecting said lugs to the rims and cover sections, spokes having threaded portions arranged in and engaging the threaded sockets in the hubs and the threaded apertures in the inner ends of the casings, toothed bars having reduced portions movable in and out in the slots of the casings, and rollers on said reduced portions, and springs contained in the casings and pressing said toothed bars outward; in combination with the frame in which the cylinder is mounted, means for rotating the cylinder, and cam bars fixed with respect to the frame and arranged to engage the rollers on the toothed bars.

4. The combination in a sheaf loader, of a main frame, a rotary cylinder mounted in the frame so as to turn adjacent to the ground, bars carried by and movable in and out in the cylinder and having teeth arranged to project beyond the periphery of the cylinder, springs for pressing and yieldingly holding the bars out, and cam bars supported on the frame and arranged to engage the ends of the bars and move the same in.

In testimony whereof I have signed my name to this specification in the presence of two subscribing witnesses.

JAS. GRAHAM.

Witnesses:
J. A. PLAYFAIR,
SYDNEY MARTIN.